US010605973B2

(12) United States Patent
Yan et al.

(10) Patent No.: US 10,605,973 B2
(45) Date of Patent: Mar. 31, 2020

(54) LIGHT GUIDE PLATE AND DISPLAY DEVICE

(71) Applicants: BOE Technology Group Co., Ltd., Beijing (CN); Chongqing BOE Optoelectronics Technology Co., Ltd., Chongqing (CN)

(72) Inventors: Genchuan Yan, Beijing (CN); Sen Tan, Beijing (CN); Mengjie Wang, Beijing (CN); Cheng Gu, Beijing (CN)

(73) Assignees: BOE Technology Group Co., Ltd., Beijing (CN); Chongqing BOE Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/133,184

(22) Filed: Sep. 17, 2018

(65) Prior Publication Data
US 2019/0302338 A1    Oct. 3, 2019

(30) Foreign Application Priority Data

Mar. 29, 2018    (CN) .................... 2018 2 0442786 U

(51) Int. Cl.
*F21V 8/00*    (2006.01)
*G02F 1/1335*    (2006.01)
(52) U.S. Cl.
CPC ......... *G02B 6/0016* (2013.01); *G02B 6/0031* (2013.01); *G02B 6/0056* (2013.01); *G02F 1/133528* (2013.01)

(58) Field of Classification Search
CPC .... G02B 6/0021; G02B 6/005; G02B 6/0051; G02B 6/0053; G02B 6/0073; G02B 6/0088; G02B 6/0045; G02F 1/13308; G02F 2001/133354; G02F 2001/13317; G02F 1/13332
See application file for complete search history.

(56) References Cited

U.S. PATENT DOCUMENTS

| 7,515,220 B2* | 4/2009 | Ko | G02B 6/0018 349/58 |
| 8,147,115 B2* | 4/2012 | Kiyose | G02B 6/0091 349/58 |
| 8,253,875 B2* | 8/2012 | Kim | G02F 1/133615 349/58 |

(Continued)

*Primary Examiner* — Peggy A Neils
(74) *Attorney, Agent, or Firm* — Arent Fox LLP; Michael Fainberg

(57) ABSTRACT

Disclosed are a light guide plate and a display device. The light guide plate includes a flat plate portion and a fixed portion, the fixed portion is arranged around a periphery of the flat plate portion, forms an installation groove for placing optical films in cooperation with the flat plate portion, a surface for forming a bottom of the installation groove in the flat plate portion forms a light emergence surface of the light guide plate; gap structures corresponding to light source particles of a light bar are formed at a first side of the fixed portion, and bottoms of the gap structures form a light incidence surface of the light guide plate which is perpendicular to the light emergence surface; and a surface of the flat plate portion back on to the installation groove forms an installation surface for installing a reflection sheet and the light bar.

16 Claims, 3 Drawing Sheets

(56) References Cited

U.S. PATENT DOCUMENTS

| | | | | |
|---|---|---|---|---|
| 8,708,546 B2* | 4/2014 | Huang | ............... | G02F 1/133608 |
| | | | | 362/632 |
| 9,632,350 B2* | 4/2017 | Nam | ................. | G02F 1/133512 |
| 9,759,858 B2* | 9/2017 | Shao | .................... | G02B 6/0088 |
| 9,869,892 B2* | 1/2018 | Kim | .................. | G02F 1/133308 |
| 2006/0262572 A1* | 11/2006 | Nagakubo | ............ | G02B 6/0038 |
| | | | | 362/634 |
| 2006/0268581 A1* | 11/2006 | Hsu | ...................... | G02B 6/0081 |
| | | | | 362/633 |
| 2016/0313487 A1* | 10/2016 | Wang | ..................... | G02B 6/009 |

* cited by examiner

LIGHT GUIDE PLATE AND DISPLAY DEVICE

I. CROSS-REFERENCE TO RELATED APPLICATION

This application claims priority of Chinese Patent Application No. 201820442786.6, filed on Mar. 29, 2018, which is hereby incorporated by reference in its entirety.

II. FIELD

The disclosure relates to the field of display technologies, and particularly to a light guide plate and a display device.

III. Background

The customers of the laptops increasingly tend to the ultra-thin design with the low power consumption, and there is a need to meet the power consumption and ensure the high brightness when the ultra-thin laptop is designed.

IV. Brief Summary

The disclosure provides the following technical solutions.

A light guide plate which includes a flat plate portion and a fixed portion, wherein the fixed portion is arranged around a periphery of the flat plate portion and forms an installation concave for placing optical film materials in cooperation with the flat plate portion, and a surface for forming a bottom of the installation concave in the flat plate portion forms a light emergence surface of the light guide plate; gap structures corresponding to light source particles of a light bar in an one to one correspondence are formed at a first side of the fixed portion, and bottoms of the gap structures form a light incidence surface of the light guide plate, the light incidence surface is perpendicular to the light emergence surface; and a surface of the flat plate portion opposite to the installation concave forms an installation surface for installing a reflection sheet and the light bar;
wherein at least two raised alignment pins are formed at an inner edge of the installation concave for fixing the optical film materials;
wherein the light guide plate further comprises vertical frames raised towards a direction opposite to the installation surface, wherein the vertical frames are arranged at edges of all sides of the fixed portion to surround a region for placing a liquid crystal panel, the vertical frame at the first side of the fixed portion is divided by the gap structures into multiple of vertical frame segments, and projections on the periphery of the gap structures form a stepped structure with reference to the flat plate portion, wherein the upper surface of the stepped structure is configured to bear a portion of the liquid crystal panel corresponding to the first side of the fixed portion.

Optionally, a depth of the installation concave is equal to the height of the alignment pins in the direction perpendicular to the light emergence surface of the light guide plate.

Optionally, the light guide plate is molded by the injection process.

The disclosure further provides a display device, which includes a reflection sheet, optical film materials and a light bar, and further includes any light guide plate in the above technical solutions; the optical film materials are installed in the installation concave of the light guide plate, and the reflection sheet and the light bar are installed on the installation surface of the light guide plate.

Optionally, the light bar includes a light bar circuit board, wherein a first surface of the light bar circuit board is opposite to the installation surface, and a part of the first surface of the light bar circuit board is fixedly connected to the installation surface by a first tape; the light source particles of the light bar are installed on the first surface of the light bar circuit board; and the reflection sheet is fixedly connected to the installation surface by a second tape.

Optionally, the display device further includes a liquid crystal panel which is located at a side of the optical film materials opposite to the reflection sheet.

Optionally, the display device further includes a shading tape which adheres to an edge region of a side surface of the liquid crystal panel towards the reflection sheet.

Optionally, when the fixed portion of the light guide plate is provided with a vertical frame, the height of the vertical frame is equal to the thickness of the liquid crystal panel.

Optionally, the display device further includes a module fixing shading tape, which covers side surfaces of the light bar, reflection sheet and light guide plate, and a non-display area of the liquid crystal panel; the side surfaces are perpendicular to the light emergence surface.

Optionally, the liquid crystal panel includes an array substrate and an opposing substrate connected by box alignment, a first polarization sheet arranged on a side surface of the array substrate opposite to the opposing substrate, and a second polarization sheet arranged on a side surface of the opposing substrate opposite to the array substrate; and a portion of the module fixing shading tape bonded with the liquid crystal panel is located at a portion of the opposing substrate beyond the second polarization sheet.

Optionally, a surface in the portion of the module fixing shading tape bonded with the liquid crystal panel is flush with a surface of the second polarization sheet opposite to the opposing substrate.

Optionally, the first tape and the second tape are integrated as the same tape.

V. BRIEF DESCRIPTION OF THE DRAWINGS

VI. DETAILED DESCRIPTION OF THE EMBODIMENTS

Figure 1:
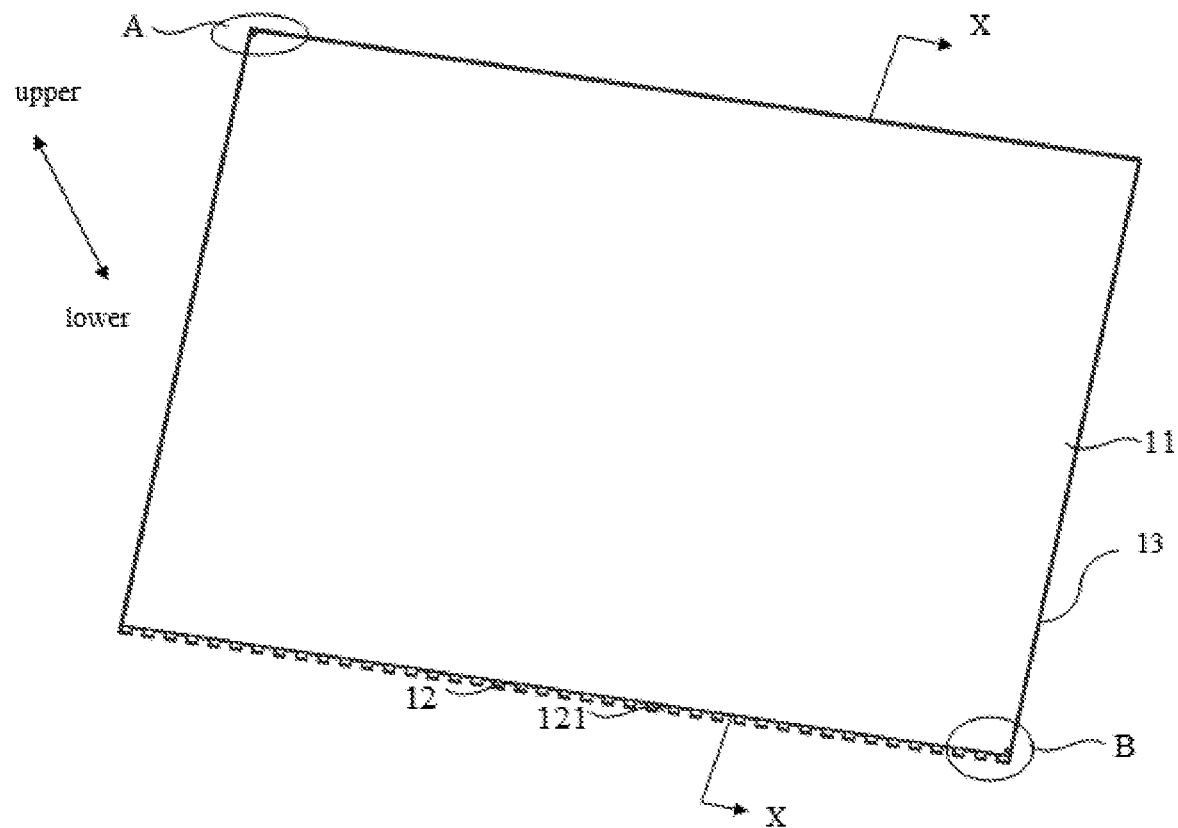
FIG. 1 is a structural schematic diagram of a light guide plate provided by an embodiment of the disclosure.

The technical solutions in the embodiments of the disclosure will be described clearly and completely below in combination with the accompanying drawings in the embodiments of the disclosure. Obviously the described embodiments are only a part of the embodiments of the disclosure but not all the embodiments. Based upon the embodiments of the disclosure, all of other embodiments obtained by those ordinary skilled in the art without creative work pertain to the protection scope of the disclosure.

The inventor found there is still some problems in accordance with the related structure design. For example, in order to ensure the high brightness and low power consumption of the display module, the thinning of the material thicknesses of all the parts may be limited to some extent, which causes the module thickness to be difficult to meet the customer specification; and furthermore, it is difficult to reduce the module thickness due to the limitations on the structure and the thickness of the back panel and the injection molding process of the adhesive frame. At present, after the thinning of the module, the assembly difficulty of the backlight source and the whole module increases greatly, which leads to the lower production line yield and the higher production cost.

Referring to FIGS. 1 to 5, the disclosure provides a light guide plate which includes a flat plate portion 11 and a fixed portion 12, where the fixed portion 12 is arranged around the periphery of the flat plate portion 11 and forms an installation concave 111 for placing the optical film materials 4 in cooperation with the flat plate portion 11, and the surface for forming the bottom of the installation concave 111 in the flat plate portion 11 forms the light emergence surface LES of the light guide plate 1; the gap structures 121 corresponding to the light source particles of a light bar in an one to one correspondence are formed at the first side of the fixed portion 12, and the bottoms of all the gap structures 121 coordinate to form the light incidence surface LIS of the light guide plate which is perpendicular to the light emergence surface LES; and the surface of the flat plate portion 11 back on to the installation concave 111 forms the installation surface for installing a reflection sheet and the light bar.

In the light guide plate provided by the above embodiment, as shown in FIGS. 1 to 5, the light guide plate includes the flat plate portion 11 and the fixed portion 12, where the fixed portion 12 is arranged around the periphery of the flat plate portion 11 and forms the installation concave 111 for placing the optical film materials 4 in cooperation with the flat plate portion 11, and the surface for forming the bottom of the installation concave 111 in the flat plate portion 11 forms the light emergence surface of the light guide plate 1; the gap structures 121 corresponding to the light source particles of the light bar in an one to one correspondence are formed at the first side of the fixed portion 12, and the bottoms of all the gap structures 121 coordinate to form the light incidence surface LIS of the light guide plate 1 which is perpendicular to the light emergence surface LES; and the surface of the flat plate portion 11 opposite to the installation concave 111 forms the installation surface for installing the reflection sheet and the light bar. The above-mentioned light guide plate can be applied in the display device directly and replace the gum and the adhesive frame structure in the traditional display device, which realizes ultra-thinning of the display device and makes the display device save the mold open fees of the expensive moulds of the gum and the adhesive frame. Also the light guide plate is an open architecture, which helps to increase the assembly efficiency and the assembly yield of the display device and save the assembly cost and labor cost of the display device. Furthermore, there are the gap structures 121 corresponding to the light source particles in an one to one correspondence on the light guide plate, which can make the light rays that easily leak out from the sides of the light source particles reenter the light guide plate, reduce the optical efficiency loss and improve the undesirable phenomenon of the incoming firefly of the light bar. Also, the gap structures 121 can further protect the light source particles from being damaged when they are pressed by the external force.

Figure 2:
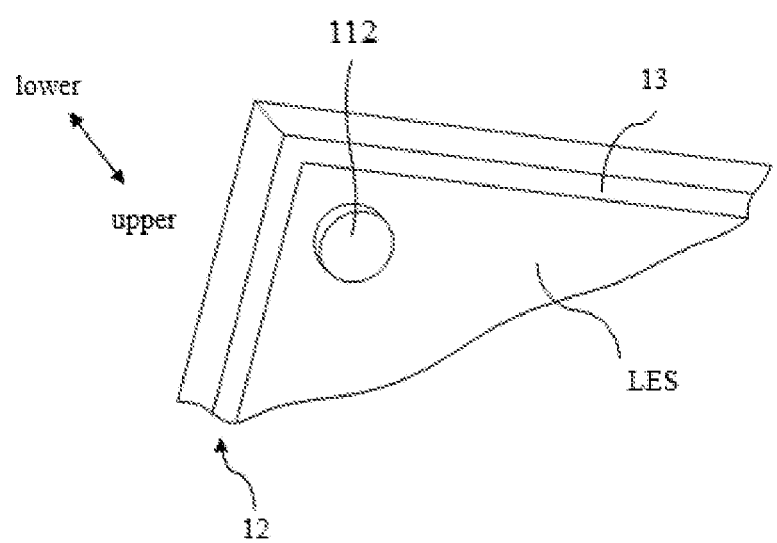
FIG. 2 is a partial enlarged diagram of the region A in FIG. 1.
Figure 3:
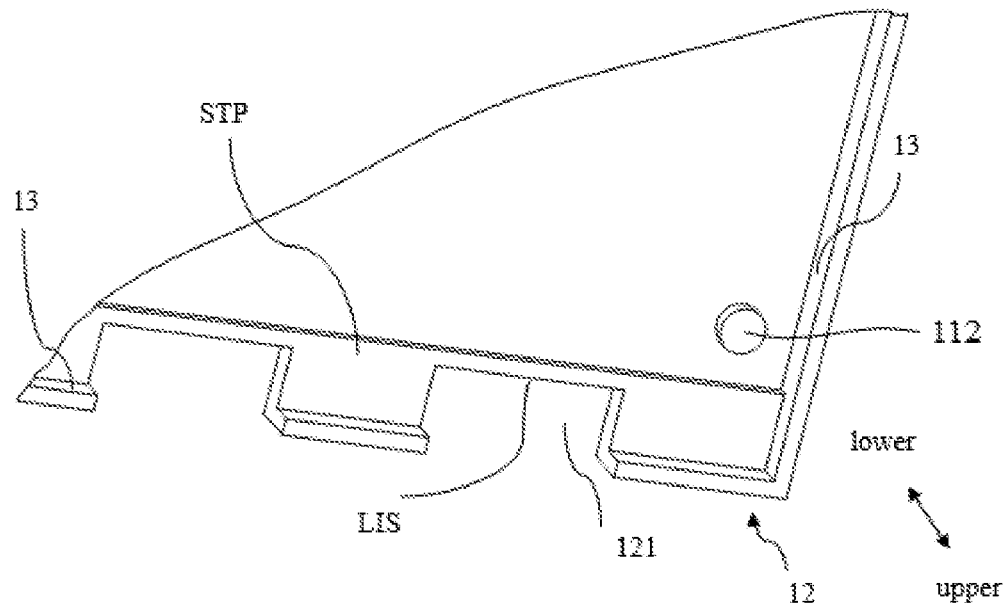
FIG. 3 is a partial enlarged diagram of the region B in FIG. 1.

In the light guide plate provided by the above embodiment, at least two raised alignment pins 112 are formed at the inner edge of the installation concave for fixing the optical film materials. The way of fixing the optical film materials by the alignment pins 112 is different from the traditional way of fixing the optical film materials by the adhesive frame slotted tape. When the alignment pins are used for positioning, the outlines of the four sides of the film all extend to the positions farther from the edges of the display area of the display device, which can prevent the edge light leakage of the display device. For example, as shown in FIGS. 1 to 3, two raised alignment pins 112 are formed at the inner edge of the installation concave 111, and optionally, the positions of the two alignment pins 112 are arranged in the diagonal line of the installation concave 111. In this embodiment, the alignment pins 112 can not only be set as the solution as shown in FIG. 1, but can also be selected according to the practical situation, which is not limited.

In the light guide plate provided by the above embodiment, the depth of the installation concave 111 is equal to the height of the alignment pins in the direction perpendicular to the light emergence surface LES of the light guide plate. The structure of the installation concave 111 helps to protect and fix the optical film materials in the display device.

Figure 4:
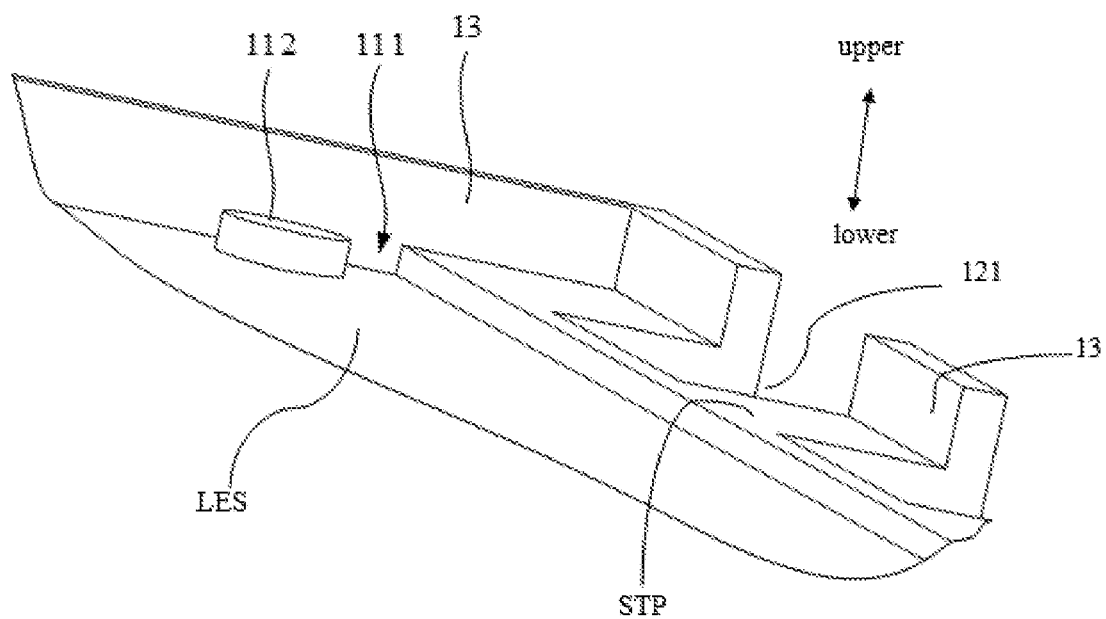
FIG. 4 is a partial enlarged diagram of the region B in FIG. 1.

In the light guide plate provided by the above embodiment, optionally, the vertical frames raised towards the direction opposite to the installation surface are arranged at the edges of all sides of the fixed portion 12 and the raised edges on both sides of each gap structure 121 at the first side of the fixed portion 12, to surround a region for placing a liquid crystal panel, and the projections on both sides of each gap structure 121 at the first side of the fixed portion 12 together with the bottom surface of the installation concave form a stepped structure STP, where the liquid crystal panel and a portion corresponding to the first side of the fixed portion lap and joint on the step surfaces of the stepped structure STP, as shown in FIG. 4. Here, the structure arrangement of the vertical frames 13 can ensure the overall boundary dimension of the assembled display device, and can play a role in the limiting displacement and protection for the liquid crystal panel installed in the region surrounded by the vertical frames 13, which increases the mechanical strength of the display device.

In the light guide plate provided by the above embodiment, the light guide plate is molded by the injection process. The boundary dimension and the mechanical strength of the whole display device are maintained by the injection heteromorphic design of the light guide plate.

Figure 5:
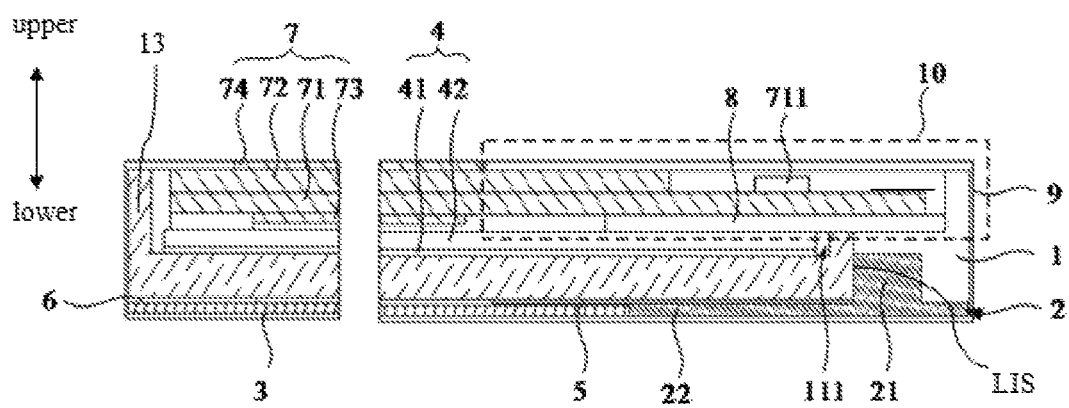
FIG. 5 is a structural schematic diagram of a cross section of a display device provided by an embodiment of the disclosure, which is a section view along the section line X-X.

An embodiment of the disclosure further provides a display device, as shown in FIG. 5, which includes a reflection sheet 3, optical film materials 4 and a light bar 2, and further includes any light guide plate 1 in the above technical solutions; the optical film materials 4 are installed in the installation concave 111 of the light guide plate 1 has, and the reflection sheet 3 and the light bar 2 are installed on the installation surface, which the light guide plate 1 has, for installing the reflection sheet 3 and the light bar 2.

In the display device provided by the above embodiment, as shown in FIG. 5, it includes the reflection sheet 3, the optical film materials 4 and the light bar 2, and further includes the light guide plate 1 provided in the above technical solutions; the optical film materials 4 are installed in the installation concave 111 which the light guide plate 1 has, and the reflection sheet 3 and the light bar 2 are installed on the installation surface, which the light guide plate 1 has, for installing the reflection sheet 3 and the light bar 2. The gum and the adhesive frame structure in the traditional display device are not arranged in the above-mentioned display device. The overall framework assembling the whole display device is formed by the light guide plate 1, to realize ultra-thinning of the display device and save the mold open fees of the expensive moulds of the gum and the adhesive frame. Also the structure of the light guide plate is an open architecture, where the light guide plate is the center, and other materials are assembled thereto respectively from the up and down directions at the same time, which is more convenient and efficient compared with the traditional unidirectional assembly way, and helps to increase the assembly efficiency and the assembly yield and save the assembly cost and labor cost.

Optionally, the light bar 2 includes a light bar circuit board 22, where the first surface of the light bar circuit board 22 is opposite to the surface of the flat plate portion 11 opposite to the installation concave 111, and a part of the first surface of the light bar circuit board 22 is fixedly connected to the surface of the flat plate portion 11 opposite to the installation concave 111 by a first tape 5; the light source particles 21 of the light bar 2 are installed on the first surface of the light bar circuit board 22; and the reflection sheet 3 is fixedly connected to the surface of the flat plate portion 11 opposite to the installation concave 111 by a second tape 6, which realizes the fixation of the light bar 2 and the reflection sheet 3.

Optionally, in an embodiment of the disclosure, the light bar circuit board 22 can be a Flexible Printed Circuit (FPC). The light source particles 21 on the light bar 2 can be LED particles.

In the display device provided by the above embodiment, it further includes a liquid crystal panel 7 which is located at the side of the optical film materials 4 opposite to the reflection sheet 3. As shown in FIG. 5, optionally, when the depth of the installation concave 111, the heights of the alignment pins 112 and the thickness of the optical film materials 4 are the same in the direction perpendicular to the light emergence surface of the light guide plate, the optical film materials 4, the fixed portion of the light guide plate 1 and the upper surface of the alignment pins 112 are in the same plane, which provides the supporting plane for installing the liquid crystal panel 7.

In the display device provided by the above embodiment, it further includes a shading tape 8 which adheres to the edge region of the side surface of the liquid crystal panel 7 towards the reflection sheet 3. The shading tape 8 can prevent the edge light leakage of the device, and simultaneously the shading tape 8 further plays a role in isolating the lower surface of the liquid crystal panel 7 from the upper surface of the optical film materials 4, to maintain a certain gap and prevent the adsorption of the film.

Optionally, the shading tape 8 can be a black tape of which a single face has the gum, and the surface adhering to the liquid crystal panel 7 has the gum.

In the display device provided by the above embodiment, when the fixed portion 12 of the light guide plate 1 is provided with a vertical frame 13, the height of the vertical frame 13 is equal to the thickness of the liquid crystal panel 7. Thus, the minimum shot thickness in the production process is maintained while the narrow border design of the display device is ensured.

In the display device provided by the above embodiment, it further includes a module fixing shading tape 9, which covers the side surfaces of the light bar 2, reflection sheet 3 and light guide plate 1, and a non-display area 10 of the liquid crystal panel 7. The module fixing shading tape 9 can fix the whole display device and prevent the edge light leakage.

Optionally, the liquid crystal panel 7 includes an array substrate 71 and an opposing substrate 72 connected by box alignment, a first polarization sheet 73 arranged on the side surface of the array substrate 71 opposite to the opposing substrate 72, and a second polarization sheet 74 arranged on the side surface of the opposing substrate 72 opposite to the array substrate 71; and the portion of the module fixing shading tape 9 bonded with the liquid crystal panel 7 is located at a portion of the opposing substrate 72 beyond the second polarization sheet 74.

Optionally, as shown in FIG. 5, the welding region 711 connected to the circuit board is formed at the edge of the side of the array substrate 71 opposite to the reflection sheet 3.

Optionally, the surface in the portion of the module fixing shading tape 9 bonded with the liquid crystal panel 7 flushes with the surface of the second polarization sheet 74 opposite to the opposing substrate 72, to realize the narrow border and the thining tendency of the display device.

In the display device provided by the above embodiment, the first tape and the second tape are integrated as the same tape. As shown in FIG. 5, one end of the reflection sheet 3 and the light bar share the first tape 5 to be fixed on the installation surface of the light guide plate 1, and the other end of the reflection sheet 3 is fixed on the installation surface of the light guide plate 1 by the second tape 6, which is convenient to assemble and saves the material cost.

Evidently those skilled in the art can make various modifications and variations to the embodiments of the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A light guide plate, comprises a flat plate portion and a fixed portion,
wherein the fixed portion is arranged around a periphery of the flat plate portion and forms an installation concave for placing optical film materials in cooperation with the flat plate portion, and a surface for forming a bottom of the installation concave in the flat plate portion forms a light emergence surface of the light guide plate; gap structures corresponding to light source particles of a light bar in a one to one correspondence are formed at a first side of the fixed portion, and bottoms of all the gap structures form a light incidence surface of the light guide plate, the light incidence surface is perpendicular to the light emergence surface; and a surface of the flat plate portion opposite to the installation concave forms an installation surface for installing a reflection sheet and the light bar;
wherein at least two raised alignment pins are formed at an inner edge of the installation concave for fixing the optical film materials,
wherein the light guide plate further comprises vertical frames raised towards a direction opposite to the installation surface, wherein the vertical frames are arranged at edges of all sides of the fixed portion to surround a region for placing a liquid crystal panel, the vertical frame at the first side of the fixed portion is divided by the gap structures into multiple of vertical frame segments, and projections on the periphery of the gap structures form a stepped structure with reference to the flat plate portion, wherein the upper surface of the stepped structure is configured to bear a portion of the liquid crystal panel corresponding to the first side of the fixed portion.

2. The light guide plate according to claim 1, wherein a depth of the installation concave is equal to heights of the alignment pins in a direction perpendicular to the light emergence surface of the light guide plate.

3. The light guide plate according to claim 1, wherein the light guide plate is molded by an injection process.

4. A display device, comprises a reflection sheet, optical film materials and a light bar, wherein the display device further comprises the light guide plate of claim 1; the optical film materials are installed in the installation concave of the light guide plate, and the reflection sheet and the light bar are installed on the installation surface of the light guide plate.

5. The display device according to claim 4, wherein the light bar comprises a light bar circuit board, wherein a first surface of the light bar circuit board is opposite to the installation surface, and a part of the first surface of the light bar circuit board is fixedly connected to the installation surface by a first tape; the light source particles of the light bar are installed on the first surface of the light bar circuit board; and the reflection sheet is fixedly connected to the installation surface by a second tape.

6. The display device according to claim 4, further comprises a liquid crystal panel which is located at a side of the optical film materials opposite to the reflection sheet.

7. The display device according to claim 6, further comprises a shading tape which adheres to an edge region of a side surface of the liquid crystal panel towards the reflection sheet.

8. The display device according to claim 4, further comprises vertical frames, wherein the vertical frames raised towards a direction opposite to the installation surface are arranged at edges of all sides of the fixed portion and raised edges on both sides of each gap structure at the first side of the fixed portion, to surround a region for placing a liquid crystal panel, and projections on both sides of the gap structures at the first side of the fixed portion form a stepped structure, wherein the liquid crystal panel and a portion corresponding to the first side of the fixed portion lap and joint on step surfaces of the stepped structure.

9. The display device according to claim 8, wherein a height of the vertical frame is equal to a thickness of the liquid crystal panel.

10. The display device according to claim 6, further comprises a module fixing shading tape, which covers side surfaces of the light bar, reflection sheet and light guide plate, and a non-display area of the liquid crystal panel; the side surfaces are perpendicular to the light emergence surface.

11. The display device according to claim 10, wherein the liquid crystal panel comprises an array substrate and an opposing substrate connected by box alignment, a first polarization sheet arranged on a side surface of the array substrate opposite to the opposing substrate, and a second polarization sheet arranged on a side surface of the opposing substrate opposite to the array substrate; and a portion of the module fixing shading tape bonded with the liquid crystal panel is located at a portion of the opposing substrate beyond the second polarization sheet.

12. The display device according to claim 11, wherein a surface in the portion of the module fixing shading tape bonded with the liquid crystal panel is flush with a surface of the second polarization sheet opposite to the opposing substrate.

13. The display device according to claim 5, wherein the first tape and the second tape are integrated as a same tape.

14. The display device according to claim 4, wherein at least two raised alignment pins are formed at an inner edge of the installation concave for fixing the optical film materials.

15. The display device according to claim 14, wherein a depth of the installation concave is equal to heights of the alignment pins in a direction perpendicular to the light emergence surface of the light guide plate.

16. The display device according to claim 4, wherein the light guide plate is molded by an injection process.

* * * * *